United States Patent [19]

Kasagi et al.

[11] 4,077,423

[45] Mar. 7, 1978

[54] HIGH PRESSURE GAS DISCHARGE VALVE DEVICE FOR SAFETY AIR BAGS

[75] Inventors: Takao Kasagi, Tokai; Satosi Kuwakado, Nishio; Toshihiro Takei, Okazaki, all of Japan

[73] Assignee: Nippon Soken, Inc., Nishio, Japan

[21] Appl. No.: 650,752

[22] Filed: Jan. 20, 1976

[30] Foreign Application Priority Data

Feb. 4, 1975 Japan .............. 50-16631[U]

[51] Int. Cl.² ............ F16K 17/40; B60R 21/08
[52] U.S. Cl. .................. 137/68 A; 220/261
[58] Field of Search .............. 220/89 A, 261; 137/68-71; 169/28; 222/3, 5; 280/737, 736

[56] References Cited

U.S. PATENT DOCUMENTS 3,567,245  3/1971  Ekstrom ............ 137/68 A X
3,921,556  11/1975  Wood et al. ............ 220/89 A X

FOREIGN PATENT DOCUMENTS 399,674  1/1974  U.S.S.R. ............ 137/68 R

Primary Examiner—Martin P. Schwadron
Assistant Examiner—Richard Gerard
Attorney, Agent, or Firm—Cushman, Darby & Cushman

[57] ABSTRACT

A high pressure gas container hermetically confining therein a high pressure gas for inflating instantaneously a safety air bag to protect occupants in a vehicle is provided with an improved discharge valve for blowing out the gas from the container. The discharge valve comprises a sealing disk disposed at a blocking cock portion, which disk has a thick center portion and thin peripheral portion so that the whole disk may be utterly ruptured upon explosion of a detonator disposed adjacent to the thicker portion of the sealing disk. Such complete destruction of the sealing disk will result in a formation of a large opening for blowing out the high pressure gas and hence allows a rapid inflation of the safety air bag due to increased flow rate of the jetted high pressure gas from the container.

2 Claims, 4 Drawing Figures

HIGH PRESSURE GAS DISCHARGE VALVE DEVICE FOR SAFETY AIR BAGS

BACKGROUND OF THE INVENTION

The present invention relates to a high pressure gas discharge valve device for a safety air bag for use in a motor vehicle.

The high pressure gas for inflating the safety air bag to protect the occupants in the motor vehicle upon collision thereof is hermetically contained in a high pressure gas container. The container is provided with a gas discharge valve at the opening portion for blowing out the gas. The opening is normally closed by the valve so that no leakage of the gas occurs from the container. The gas discharge valve comprises a blocking cock having a sealing disk. In hitherto known blocking cocks, the sealing disk is formed with a circular groove extending along the periphery and a plurality of straight grooves passing through the center of the disk and intersecting with one another. The blowing out of the high pressure gas from the container takes place when the sealing disk is ruptured or destructed under exploding force automatically produced by a detonator upon the collision of the vehicle. However, in the case of the hitherto known valve structure, the sealing disk is nearly partially ruptured, especially, only the crossed section of the grooves is easily broken, so that only a small aperture is available for the jetted high pressure gas with the flow rate thereof being restricted. Consequently, a rapid inflation of the air bag can not be accomplished with the conventional valve structure.

SUMMARY OF THE INVENTION

Accordingly, an object of the present invention is to provide a blocking cock assembly for a high pressure gas container which is evaded from the disadvantages of the conventional valve device described above.

Another object of the invention is to provide a high pressure gas discharge valve device having a sealing disk which can be completely destructed under an instantaneous explosive force to provide a large aperture or opening for the high pressure gas blown out from the gas container, thereby to speed up the inflation of the safety air bag.

According to one feature of the present invention, there is provided a high pressure gas discharge valve or cock device of a rupture type mounted at an opening portion of a high pressure gas container for supplying a high pressure gas to a safety air bag, comprising a sealing disk which constitutes a rupture portion disposed at the opening portion and is formed with a circular groove extending along the periphery of the sealing disk and a plurality of radial grooves extending from the circular groove toward the center portion of the disk in such a manner that a thick portion remains at the center portion, and means for producing an explosive force applied to the sealing disk.

BRIEF DESCRIPTION OF THE DRAWINGS

Above and other objects, features and advantages of the invention will be more apparent from the following description taken in connection with the accompanying drawings, in which.

DETAILED DESCRIPTION OF PREFERRED EMBODIMENTS

Figure 1:
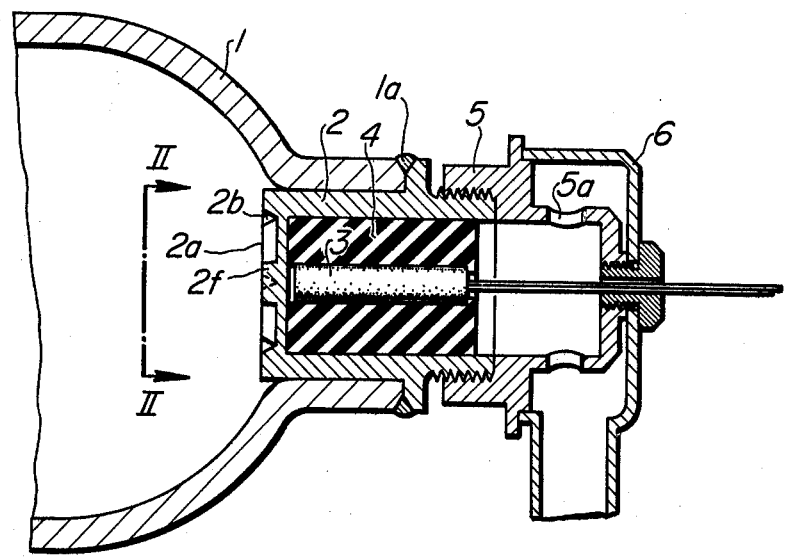
FIG. 1 is a vertical sectional view showing an embodiment of the high pressure gas discharge valve according to the invention.
Figure 2:
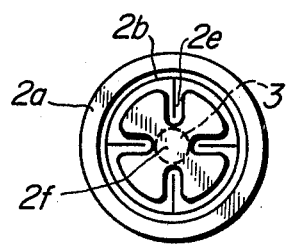
FIG. 2 is a side view of the same as viewed from the line II—II in FIG. 1.

Referring to FIGS. 1 and 2, a high pressure gas container 1 has an opening end portion into which a blocking cock 2 made of steel or like material is snugly fitted. The cock 2 is sealingly and integrally secured to the container 1 by welding as indicated by 1a. In this state, a gas at a high pressure is hermetically contained in the container 1. Formed integrally in the end surface of the cock 2 at the side facing the interior of the high pressure gas container 1 is a sealing disk 2a in which there are formed a circular groove 2b of a V-like cross-section extending along the periphery of the disk 2a and four radial grooves 2e of a V-like cross-section extending radially from the circular groove 2b toward the center of the disk 2a. The formation of these grooves may be effected by a number of known methods such as a press work, for example. It is to be noted that the four radial grooves extend short of the geometrical center of the sealing disk 2a, leaving a thick portion 2f at the center having a substantially same diameter as that of a detonator 3. The sealing disk 2a may be applied with a surface hardening treatment. It is further noted that the pressure at which gas is filled in the container 1 is determined in dependence on the depth of the V-like grooves 2b and 2e. The blocking cock 2 is shaped cylindrically. The detonator or blast cap 3 is disposed in alignment with the thick portion 2f of the sealing disk 2a with a right angle thereto and positioned in place by means of a retainer 4 made of an insulation material such as a gum or a synthetic rubber.

It will also be appreciated that the number and the cross-sectional configuration of the radial grooves 2e are not restricted to four and the V-like contour, respectively. For example, three to six grooves having a U-like or a rectangular cross-section may also be employed.

The high pressure gas as jetted from the open end portion of the container 1 is conducted into an air bag (not shown) installed in a front portion of a compartment of a vehicle through a nozzle 5, nozzle orifices 5a and a manifold 6.

Next, operation of the high pressure gas discharge valve constructed as mentioned above according to the invention will be described. Normally, the high pressure gas is hermetically confined within the container 1 by means of the blocking cock 2, as is shown in FIG. 1. However, when a collision detector (not shown) detects the collision of the vehicle, the electric detonator 3 is supplied with an electric current and explodes in an instant. The retainer 4 is ruptured by the explosive force and pushed outwardly through the orifices 5a of the nozzle 5. At the same time, the sealing disk 2a is also destructed along the circular V-like groove 2b as well as the radial grooves 2e. Due to the presence of the thick center portion 2f, the whole structure of the sealing disk 2a is utterly destructed, whereby the opening portion of the high pressure container 1 is made completely free. The ruptured pieces of the sealing disk 2a are blown outwardly by the jet of high pressure gas flow from the container 1 and retained in the nozzle 5 without obstructing the passage of the high pressure gas flow. In this manner, the high pressure gas can rapidly blow out from the ruptured opening through the orifices 5a of the nozzle 5 into the manifold 6 and hence is discharged through a diffuser (not shown) into the air bag as a uniform gas flow, which bag is then instantaneously inflated, thereby to protect the occupants in the vehicle from the danger of colliding against the instrument panel or the like portion.

Figure 3:
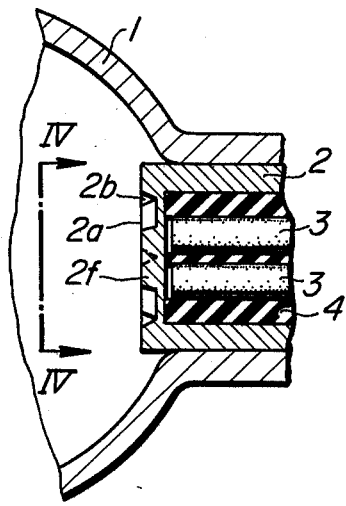
FIG. 3 shows in a vertical sectional view a main portion of another embodiment of the high pressure gas discharge valve according to the invention.
Figure 4:
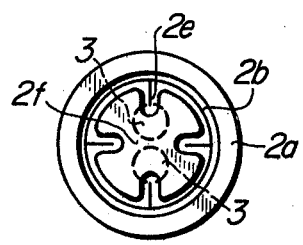
FIG. 4 is a side view of the same as viewed from the line IV—IV in FIG. 3.

The present invention is not to be restricted to the embodiment described above. For example, the invention can be implemented in such a structure shown in FIGS. 3 and 4 in order to meet the requirement for a high reliability of the occupant protection device for use in a motor car or the like vehicle. Referring to FIGS. 3 and 4, the embodiment shown therein comprises also a sealing disk 2a having a circular V-like groove 2b formed along the peripheral portion thereof and radial V-like grooves 2e extending from the circular groove 2b to the center of the sealing plate as is in the case of the preceding embodiment. However, in the device shown in FIGS. 3 and 4, two electric detonators 3 are used and the portions of the disk 2a aligned with the centers of the respective detonators are made thicker than the remaining portion. With such arrangement of the explosive device, even when one of the detonators 3 should not be exploded at the time of collision of the vehicle for some reasons such as deterioration of the detonator, the other one will explode, which results a high probability of exploding, whereby the sealing disk 2a will be ruptured along the circular and radial grooves 2b and 2e into four pieces, allowing the unobstructed rapid discharge of the high pressure gas as in the case of the embodiment shown in FIGS. 1 and 2.

As will be appreciated from the foregoing description, the high pressure gas discharge valve device according to the invention has a rupture portion composed of a sealing disk which is formed with a peripheral circular groove and a plurality of radial grooves extending from the circular groove toward the center portion of the disk with a thick portion remaining about the center of the sealing disk, while detonator(s) is disposed at the rear side of the sealing disk in alignment with the thicker portion thereof. Due to such construction, a large gas release opening will result upon the explosion of the denotator. The high pressure gas confined in the container, thus, can blow out without being obstructed by the ruptured pieces of the sealing disk, which in turn assures a desirable and uniform gas flow into the safety air bag with a high reliability.

What is claimed is:

1. A high pressure gas discharge valve device of rupture type mounted at an opening portion of a high pressure gas container for supplying a high pressure gas to a safety air bag, comprising:
  i. a sealing disk which constitutes a rupture wall portion disposed at said opening portion and is formed on at least one side of said rupture wall portion with a circular groove extending along the periphery of said disk and a plurality of radial grooves extending from said circular groove toward the center portion of said disk in such a manner that a thick ungrooved portion remains at said center portion; and
  ii. explosion means for producing an explosive force which is applied to said sealing disk for rupturing said sealing disk, said explosion means having one detonator so arranged that the longitudinal center axis thereof intersects said thick ungrooved portion in said sealing disk and that the whole exploding-end surface of said detonator is substantially covered by said thick ungrooved portion in said sealing disk.

2. A high pressure gas discharge valve device as set forth in claim 1, wherein said explosion means includes a plurality of detonators so arranged that the longitudinal center axes thereof intersect the thick ungrooved portion in said sealing disk and that the whole exploding surfaces of said detonators are substantially covered by said thick ungrooved portion in said sealing disk.

* * * * *